(12) United States Patent
Cai et al.

(10) Patent No.: US 11,059,987 B2
(45) Date of Patent: Jul. 13, 2021

(54) SECURITY PRINTING INKS FOR INKJET PRINTERS AND METHOD OF MANUFACTURE

(71) Applicant: TROY GROUP, INC., Costa Mesa, CA (US)

(72) Inventors: Xiaorong Cai, Mount Pleasant, SC (US); Michael R. Riley, Steubenville, OH (US)

(73) Assignee: TROY GROUP, INC., Costa Mesa, CA (US)

( * ) Notice: Subject to any disclaimer, the term of this patent is extended or adjusted under 35 U.S.C. 154(b) by 0 days.

(21) Appl. No.: 16/842,536

(22) Filed: Apr. 7, 2020

(65) Prior Publication Data

US 2020/0239720 A1 Jul. 30, 2020

Related U.S. Application Data

(62) Division of application No. 15/791,135, filed on Oct. 23, 2017, now Pat. No. 10,626,282.

(60) Provisional application No. 62/412,063, filed on Oct. 24, 2016.

(51) Int. Cl.
| | |
|---|---|
| *C09K 11/02* | (2006.01) |
| *C09D 11/50* | (2014.01) |
| *C09D 11/328* | (2014.01) |
| *C09D 5/22* | (2006.01) |
| *C09D 11/322* | (2014.01) |
| *C09K 11/77* | (2006.01) |

(52) U.S. Cl.
CPC .............. *C09D 11/50* (2013.01); *C09D 5/22* (2013.01); *C09D 11/322* (2013.01); *C09D 11/328* (2013.01); *C09K 11/02* (2013.01); *C09K 11/7773* (2013.01)

(58) Field of Classification Search
USPC .................................................. 252/301.36
See application file for complete search history.

(56) References Cited

U.S. PATENT DOCUMENTS

| | | | |
|---|---|---|---|
| 6,060,426 A | 5/2000 | Tan | |
| 6,165,609 A | 12/2000 | Curatolo | |
| 6,813,011 B2 | 11/2004 | Gardner et al. | |
| 6,861,012 B2 | 3/2005 | Gardner et al. | |
| 8,975,597 B2 | 3/2015 | Van Asbrouck et al. | |
| 2002/0105633 A1 | 8/2002 | Gardner et al. | |
| 2003/0015867 A1 | 1/2003 | Petkovsek | |
| 2004/0118321 A1* | 6/2004 | Fu | C09D 11/101 106/31.58 |

(Continued)

OTHER PUBLICATIONS

PCT International Search Report and Written Opinion, Patent Cooperation Treaty, PCT/US17/58005, dated Dec. 14, 2017, 12 pages.

*Primary Examiner* — James E McDonough

(57) ABSTRACT

High security inkjet inks are made my milling two or more functional materials, such as invisible ultraviolet fluorescent dyes or pigments, infrared Anti Stokes upconverting pigments, infrared absorption and fluorescent dyes or pigments and iron oxide magnetic pigments, into a pigment dispersion. A wet media mill is used to mill the pigment dispersion until the average particle size is below 300 nm. The dispersion is combined with main components of an inkjet ink, such as deionized water, humectants, surfactants, polymer resin and biocides, to produce the high security inkjet ink.

5 Claims, 3 Drawing Sheets

(56) References Cited

U.S. PATENT DOCUMENTS

| | | |
|---|---|---|
| 2005/0031838 A1 | 2/2005 | Lagunowich et al. |
| 2008/0087189 A1 | 4/2008 | Lin et al. |
| 2011/0074867 A1 | 3/2011 | Nishimura et al. |
| 2011/0263037 A1 | 10/2011 | Herz |
| 2014/0001377 A1* | 1/2014 | Iftime .................. C09D 11/50 250/461.1 |
| 2014/0261031 A1* | 9/2014 | Kellar ................. B42D 25/382 101/211 |
| 2015/0337150 A1* | 11/2015 | Cai ..................... C09D 11/322 252/62.54 |

* cited by examiner

US 11,059,987 B2

SECURITY PRINTING INKS FOR INKJET PRINTERS AND METHOD OF MANUFACTURE

CROSS REFERENCE TO RELATED APPLICATIONS

This is application is a divisional of application Serial Number U.S. Ser. No. 15/791,135 filed Oct. 23, 2017 for "Security Printing Inks for Inkjet Printers and Method of Manufacture", which claims the benefit and priority of provisional application Ser. No. 62/412,063, filed Oct. 24, 2016 for "Multi-Functional Security Ink" and is incorporated by reference herein.

BACKGROUND OF THE INVENTION

1. Field of the Invention

The present invention relates generally to improvements in security inks and more particular pertains to new and improved security inks for use in inkjet printers.

2. Description of Related Art

Security inks that provide a security feature to printed documents have used ultraviolet (UV) fluorescent materials in the ink. Secure markings printed on a document by the UV fluorescent inks can then be detected using a black light with peak wavelengths at about 365 nm or 398 nm. As a result of many years of use, UV fluorescent inks are relatively easy to make and UV flashlights are readily obtainable and quite popular. As a result, the security provided by the use of UV fluorescent inks on printed documents has been considerably decreased. To help increase security, UVA fluorescent materials are beginning to be used. A security ink containing UVA fluorescent pigment powders are virtually invisible on paper. However, when exposed to a 365 nm black light, a unique fluorescent color becomes visible. UVB fluorescent material, which fluoresce in the 280 to 350 nm range using a 300 nm black light, will cause printed markings to appear in a distinctive color. UVC materials will fluoresce in the 100 to 280 nm range when illuminated by a 254 nm black light. These materials fluoresce at different distinctive colors. The colors may range from a blue to a very deep red. Other materials, such as IR-Anti Stokes upconverting material, have fluorescent capabilities as the result of a Stokes shift. This is the difference in wavelength between the band maximum of the absorption spectra and emission spectra. These materials generally fluoresce by emitting a longer wavelength photon in response to absorbing a shorter wavelength photon.

These fluorescent materials are available in the marketplace. Some have been used in security inks. In spite of this, the level of security required for sensitive documents has simply not been achieved. The present invention provides the required increased level of security by combining fluorescent materials to provide multiple different color emissions that can only be detected under different wavelength light sources.

SUMMARY OF THE INVENTION

The increased security provided by the present invention is the result of using fluorescent materials that emit multiple and different color emissions in a single inkjet ink composition. The process of making the ink of the present invention produces an inkjet ink that is stable and durable on the shelf and on the printed page. The inkjet ink contains a pigment dispersion of multiple fluorescent dyes or pigments, such as UVC dyes, UVA pigments, bi-fluorescent pigments and IR upconverting pigments, for example. The pigment dispersion is made by milling a mixture of the chosen multiple fluorescent material with a polymer dispersant, organic solvent, deformer and water in a wet media mill until average particle size is below 300 nm. This multiple fluorescent pigment dispersion is then added to a preferred inkjet ink formulation to produce the high security inkjet ink. A preferred inkjet ink formulation may contain humectants, surfactants, polymer resin, biocides and deionized water, for example.

BRIEF DESCRIPTION OF THE DRAWINGS

The objects and features of this invention will become apparent to those skilled in the art as reference is made to the following description of preferred embodiments when considered in conjunction with the accompanying drawing in which like reference numerals designate like parts throughout the figures thereof and wherein.

DETAILED DESCRIPTION OF THE PREFERRED EMBODIMENTS

The high security ink of the present invention utilizes two or more fluorescent materials chosen from a group of fluorescent materials, such as, invisible ultraviolet fluorescent dyes/pigments, infrared Anti Stokes upconverting pigments, infrared absorption and fluorescent dyes/pigments and iron oxide magnetic pigments, for example. The problem of combining two or more of these fluorescent materials into an ink solution to obtain an ink that is stable on the shelf and on the printed page, is overcome by the present invention.

The main components of an inkjet ink familiar to those skilled in the art, is utilized as a foundation. The aqueous based inkjet ink foundation consists of deionized (DI) water, humectants, surfactants, polymer dispersants/binders, biocide and other additives, as needed to improve the ink printing quality and the interaction between the ink and the substrate printed upon.

Figure 1:
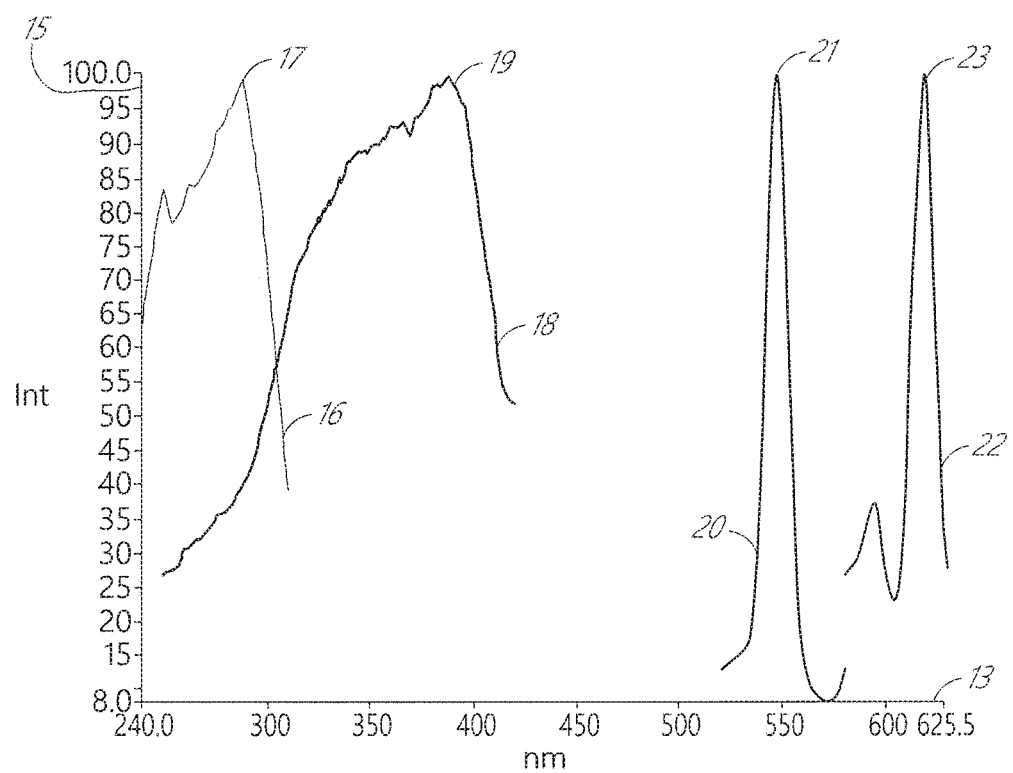
FIG. 1 is an example of an excitation and emission spectra of a UV dual-fluorescent pigment that may be used in the present invention.

The present invention contemplates combining multiple different fluorescent materials which are carefully selected. FIG. 1 illustrates a UV visible biofluorescent yellow-green and red organic pigment that luminesces in two distinctly different wavelengths. FIG. 1 illustrates excitation and emission spectra in terms of intensity level 15 against wavelength 13 in nanometers. Excitation band 16 has a maximum at 288 nm and an emission band 20 with a maximum emission wavelength of 547 nm. At 547 nm, the material fluoresces in the yellow light range, when excited.

The same material has an excitation band 18 with a maximum at 387 nm and an emission band 22 with a maximum at 618 nm. At 618 nm, the material fluoresces in the red-orange light range when excited.

Figure 2:
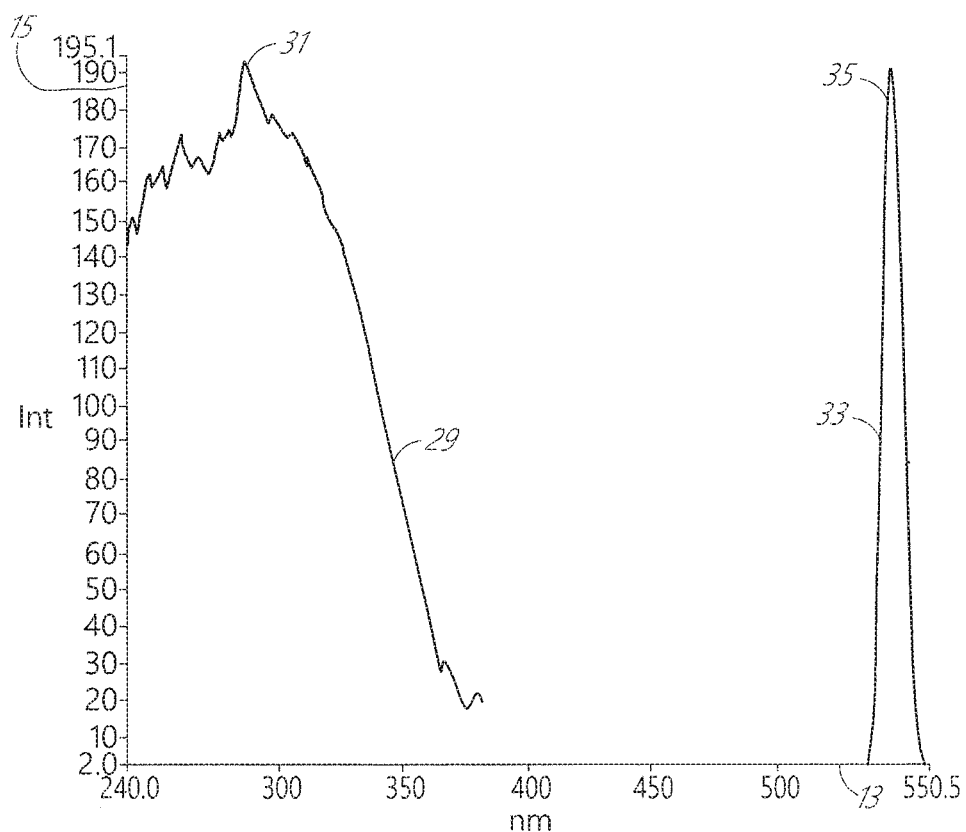
FIG. 2 is an example of an excitation and emission spectra for UVC fluorescent material that may be used in the present invention.

FIG. 2 illustrates the excitation and emission spectra for a UVC fluorescent material having an excitation band 29 with a peak 31 at 288 nm and an emission band 33 with a peak 35 at 545 nm. This material fluoresces in the yellow light range when excited.

Figure 3:
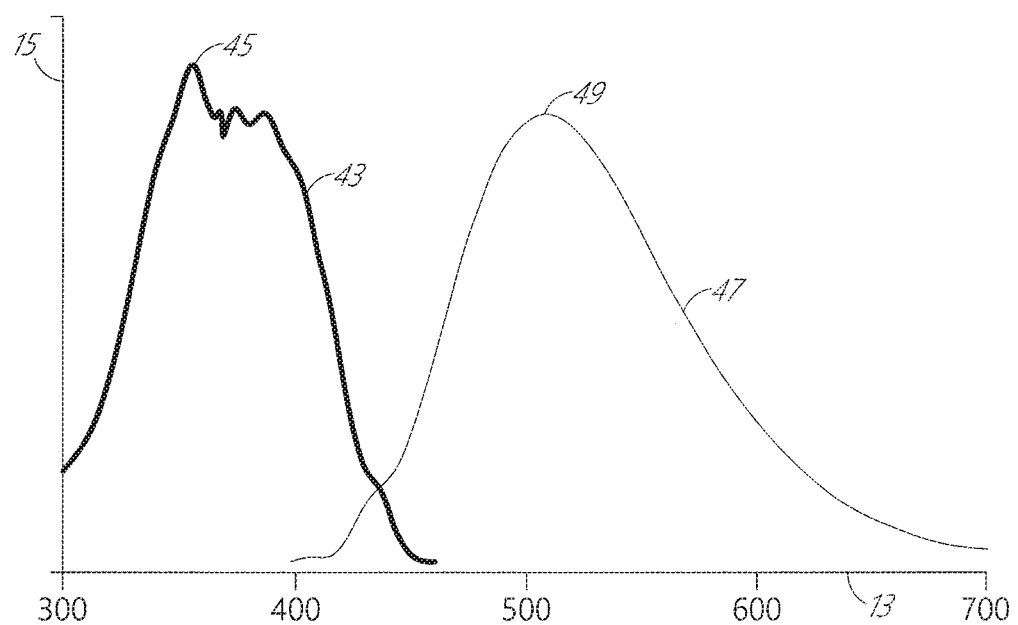
FIG. 3 is an example of an excitation and emission spectra of UVA fluorescent material that may be used in the present invention.

FIG. 3 illustrates the excitation and emission spectra for a UVA fluorescent material having an excitation band 43 with a peak 45 at 350 nm and an emission band 47 with a peak 47 at 500 nm. This material fluoresces in the green light range when excited.

The UVA and UVC materials shown in FIGS. 3 and 2, for example, can be combined with each other to produce the high security inkjet ink of the present invention. The fluorescent materials shown in FIGS. 1, 2 and 3 could be combined with each other, or all together for example. The selection of these materials, however, must create a combination that becomes visible in different distinct colors when exposed to respective different wavelengths of light.

Once the appropriate fluorescent materials have been selected, a major issue is how to combine them into a water-based inkjet ink foundation of humectants, surfactants, polymer resins, biocides and deionized water.

In order to produce a stable inkjet ink with the required multi-colored fluorescent capabilities of the present invention, it is critical that the multi-fluorescent pigments and dyes are processed as a dispersion. The dispersion is then added to the inkjet ink foundation solution.

Figure 4:
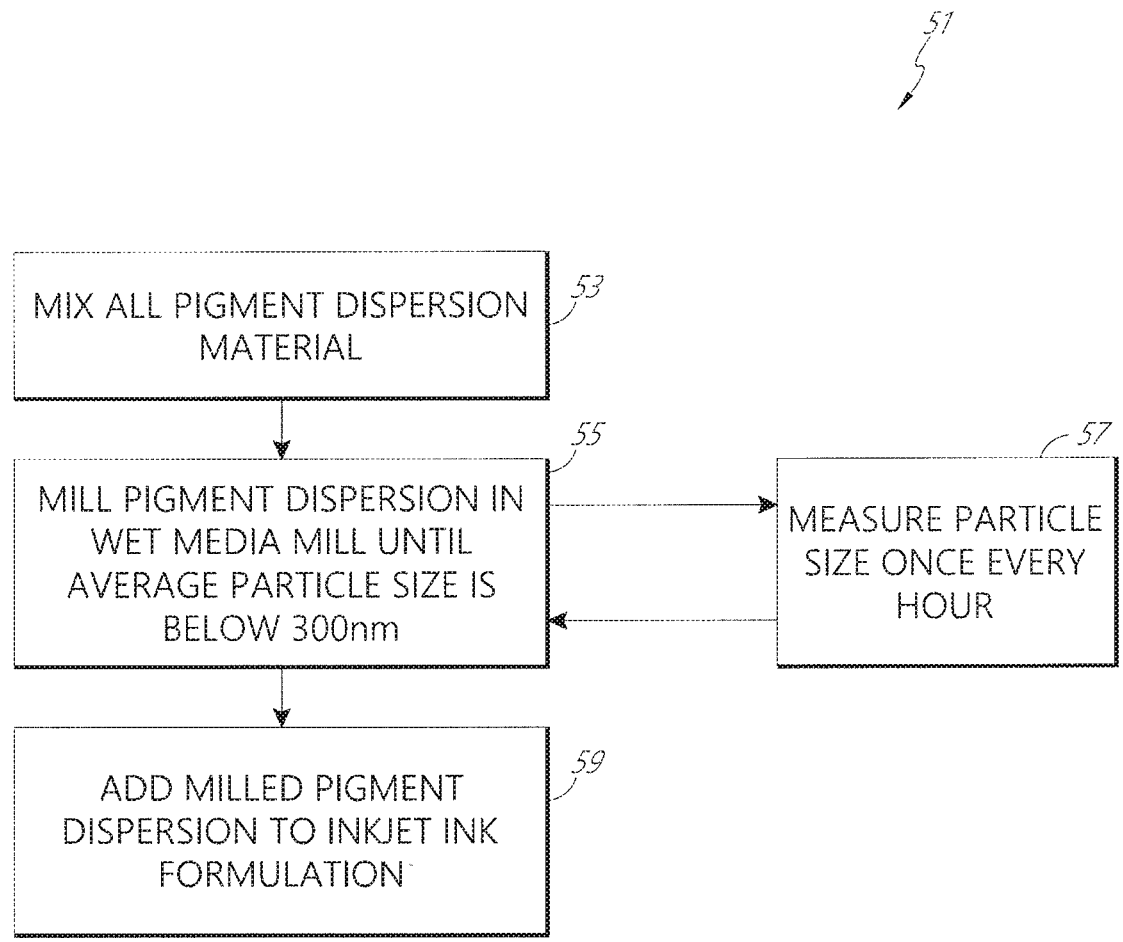
FIG. 4 is a block diagram illustrating a method of manufacturing the high security ink of the present invention.

Referring now to FIG. 4, which illustrates the method 51 of manufacturing the inkjet ink of the present invention, two or more of the selected fluorescent dyes and pigments are pre-mixed 53 with a polymer dispersant, organic solvent, deformer and deionized (D1) water. The mixture is then processed 55, by a wet media mill, such as a Netzsch MiniCer Mill made by NETZCH Premier Technologies of Exton, Pa., for example. The mixture is milled for one to eight hours, until the average particle size is below 300 nm, creating a desired stable, uniform pigment dispersion.

The polymeric dispersants that may be used in the pigment dispersion are acrylic copolymers, polystyrene acrylic polymers, alkali salts of sulphonated naphthalene formaldehyde condensates, lignin or lignin derivatives, such as lignosulphonate, the reaction products with alkali sulfite and formaldehyde and other block copolymer with pigment affinic groups. The pigment to dispersant ratio found most beneficial for the present invention is 1 to 10.

The particle size of the dispersion being milled by the Netzch MiniCer Mill is preferably measured every hour, using a Malvern Nano-Z90 Zetasizer.

Specific formations for five different multiple fluorescent pigment dispersions produced by the inventors are illustrated in the table below.

Dispersion 1 illustrated in the table uses a bi-fluorescent pigment in combination with a dispersant, BYKJET-9170 which is the product of BYK-CHEMIE GMBH of Wesel, Germany, in addition to a deformer and deionized water. This combination is mixed and then milled in a wet media mill until the final average particle size is 185 nm.

Dispersion 2 illustrated in the table utilizes a combination of a UVC fluorescent dye and a UVA fluorescent pigment in addition to a dispersant, Joncryl HPD 296 which is made by BASF Corporation of Florham Park, N.J., in addition to a deformer and deionized water. This combination is then milled in a wet media mill until an average final particle size less than 150 nm.

Dispersion 3 utilizes a combination of UVC fluorescent dye and an IR upconverting pigment in addition to the Joncryl HPD 296 dispersant, along with a deformer and deionized water.

Dispersion 4 utilizes a combination of UVA fluorescent pigment and an IR upconverting pigment in addition to the Joncryl HPD 296 dispersant, along with a deformer and deionized water.

Dispersion 5 utilizes a bi-fluorescent pigment in combination with an IR upconverting pigment in addition to the BYKJET-9170 dispersant, along with a deformer and deionized water.

Dispersions 2, 3, 4 and 5 illustrated in the table are all milled in the wet media mill until a final average particle size of less than 150 nm.

Once the pigment dispersion has been properly processed in the wet media mill, it must be added 59 to a chosen inkjet ink foundation which generally consists of humectants, surfactants, polymer resin, biocide and deionized water, to produce the inkjet ink of the present invention.

An example of a dual-fluorescent inkjet ink made by mixing Dispersion 1 with a preferred inkjet ink foundation contains:

Dispersion 1: 0.5% to 5% by weight
Humectants: 20% by weight
Surfactant: 0.5% by weight
Polymer resin: 1% by weight
Biocide: 0.15% by weight
Balance D. I. water By adding Dispersion 1 into the inkjet ink formulation listed above, a dual-fluorescing UV fluorescent inkjet ink is produced. The bi-fluorescent pigment used in the above example of the dual-fluorescent inkjet ink is LUBIC1 bi-fluorescent pigment from Luminochem Kft. Of Budapest, Hungary.

The produced ink was printed using an HP Officejet Pro 8210 inkjet printer on UV dull paper for the document. The printed document was invisible under visible light. When exposed to 254 nm UV light, yellow-green color characters became visible. When exposed to 365 nm UV light, red color characters became visible.

| Dispersion-1 | Dispersion-2 | Dispersion-3 | Dispersion-4 | Dispersion-5 |
|---|---|---|---|---|
| Bifluorescent pigment, 25% | UVC fluorescent dye, 13% | UVC fluorescent dye, 15% | UVA fluoresent pigment, 15% | Bifluorescent pigment, 15% |
| BYKJET 9170, 8% | UVA fluorescent pigment, 12% | IR Upconverting pigment, 20% | IR Upconverting pigment, 15% | IR Upconverting pigment, 15% |
| Deformer, 1% | Joncryl HPD 296, 4% | Joncryl HPD 296, 7% | Joncryl HPD 296, 10% | BYKJET 9170, 10% |
| D.I. Water, balanced | Deformer, 0.5% | Deformer, 0.5% | Deformer, 0.5% | Deformer, 1% |
| Final particle size (ave.): 185 nm | D.I. Water, balanced | D.I. Water, balanced | D.I. Water, balanced | D.I. Water, balanced |
| | Final particle size (ave.): <150 nm | | | |

A high security inkjet ink utilizing Dispersion 2 was made using the process of FIG. 4, creating a dual-function UV fluorescent inkjet ink.

Dispersion 2: 0.5% to 5% by weight
Humectants: 20% by weight
Surfactant: 0.5% by weight
Polymer resin: 1% by weight
Biocide: 0.15% by weight
Balance D. I. water The UVA fluorescent pigment utilized in Dispersion 2 was a LUPTIL2 invisible red fluorescent pigment made by Luminochem Kft. of Budapest, Hungary. The UVC fluorescent dye used in Dispersion 2 was a LUWS6 invisible green fluorescent dye from Luminochem Kft. of Budapest, Hungary.

The resulting ink was printed by an HP Officejet Pro 8210 inkjet printer on UV dull paper. The printing on the document was not visible under visible light. When exposed to 254 nm ultraviolet light, yellow-green color characters became visible. When exposed to 365 nm ultraviolet light, red color characters became visible.

The present invention contemplates the use of UVA or UVC fluorescent dyes or pigments in combination with 980 nm infrared Anti Stokes upconverting pigment. This combination of fluorescent materials when printed produces covert characters that can be identified by UVC/UVA light. The Anti Stokes upconverting pigment can be detected by an IR taggant detecting device, such as an 980 nm infrared (IR) laser pointer.

The Anti Stokes upconverting pigments contemplated for use in the present invention can be, for example, β-NaYF4 crystal, such as a mixture of Er and Yb-based crystals which provide a green light. It could be a mixture of Tm and Yb-based crystals which emit a blue light. It could be mixture of Tm and Er-based crystals which emit a red light. These materials are commercially available, such as ADA-3251, ADA-3252, ADA-3253 from H.W. Sands Corp. of Jupiter, Fla. and LUUPC1, LUUPC2, and LUUPC3 from Luminochem Kft. of Budapest, Hungary. The 980 nm upconversion phosphors can be obtained from Fine Chemical Co., Ltd. of Weifang, China as well as from other different manufacturers.

A high security ink made by the inventors using Dispersion 3 contains:

Dispersion 3: 0.5% to 5% by weight
Humectants: 20% by weight
Surfactant: 0.5% by weight
Polymer resin: 1% by weight
Biocide: 0.15% by weight
Balance D. I. water The IR upconverting pigment used in Dispersion 3 was an ADA3252 IR Anti Stokes upconverting pigment made by H. W. Sands Corp. of Jupiter, Fla. The UVC fluorescent dye used in Dispersion 3 was a LUWSS invisible red fluorescent dye from Luminochem Kft. of Budapest, Hungary.

The resulting inkjet ink was printed by an HP Officejet Pro 8210 inkjet printer on a UV dull paper. The printing on the printed document was invisible under visible light. When exposed to 254 nm UV light, red color characters became visible. When exposed to a 980 nm infrared laser pointer, green characters became visible.

A high security ink made by the inventors using Dispersion 4 contains:

Dispersion 4: 0.5% to 5% by weight
Humectants: 20% by weight
Surfactant: 0.5% by weight
Polymer resin: 1% by weight
Biocide: 0.15% by weight
Balance D.I. water The resulting ink was printed by an HP Officejet Pro 8210 inkjet printer on UV dull paper. The printing on the document was invisible under visible light. When exposed to 316 nm ultraviolet light, red color characters became visible. When exposed to a 980 nm infrared laser pointer, green color characters became visible.

A high security ink made by the inventors using Dispersion 5 contains:

Dispersion 5: 0.5% to 5% by weight
Surfactant: 0.5% by weight
Polymer resin: 1% by weight
Biocide: 0.15% by weight
Balance D. I. water The resulting ink was printed by an HP Officejet Pro 8210 inkjet printer on UV dull paper. The printing on the document was invisible under visible light. When exposed to 365 nm ultraviolet light, red color characters became visible. When exposed to 254 nm ultraviolet light, green color characters became visible. The green color could also have been detected by using a 980 nm infrared laser pointer.

In summary, the security printing ink for inkjet printers of the present invention may include materials that fluoresce at two to five different colors. These materials are preferably selected from UVC fluorescent material, UVA fluorescent material, 980 nm IR Anti Stokes upconverting material, infrared fluorescent materials and infrared absorption materials. The fluorescent functions of these materials can be detected using corresponding wavelengths of UV lights. The IR fluorescent function can be detected using correspondent wavelengths of UV or visible light and can be observed using an IR camera. IR absorption can be detected using an IR camera with a corresponding wavelength. The IR Anti Stokes upconverting function can be detected using an 980 nm IR laser pen.

The invention claimed is:

1. A method of making a security ink comprising the steps:
mixing two or more fluorescent materials selected from the group consisting of a UVC fluorescent dye at 15% by weight, a UVA fluorescent pigment at 15% by weight and a bi-fluorescent material at about 1% by weight with an IR upconverting pigment at about 15% to 20% by weight, to provide multiple different visible color emissions when exposed to respective different wavelengths of light, the fluorescent mixture being at 25% to 35% by weight of a pigment dispersion containing a dispersant at 4% to 10% by weight of the pigment dispersion, a deformer at 0.5% to 1% by weight of the pigment dispersion and deionized water;
milling the pigment dispersion in a wet mill until the average particle size is below 300 nm; and
adding the milled pigment dispersion to an inkjet ink formulation.

2. The method of claim 1 wherein the pigment dispersion is at about 0.5% to 5% by weight of the security ink; and the inkjet ink contains:
humectant at about 20% by weight of the security ink,
surfactant at about 0.5% by weight of the security ink,
polymer resin at about 1% by weight of the security ink, and
biocide at about 0.15% by weight of the security ink.

3. The method of claim 1 wherein the milling step comprises milling the pigment dispersion until an average particle size of about 185 nm is achieved.

4. The method of claim 1 wherein the milling step comprises milling the pigment dispersion until an average particle size less than 150 nm is achieved.

5. The method of claim 1 further comprising measuring particle size of the pigment dispersion every hour until a desired size is achieved.

\* \* \* \* \*